United States Patent [19]

Ishikawa

[11] Patent Number: 5,276,526

[45] Date of Patent: Jan. 4, 1994

[54] DECODING DEVICE FOR TWO-DIMENSIONAL CODES BY USING FIRST OR SECOND REFERENCE LINE SIGNALS

[75] Inventor: Yuji Ishikawa, Yokohama, Japan

[73] Assignee: Canon Kabushiki Kaisha, Tokyo, Japan

[21] Appl. No.: 749,888

[22] Filed: Aug. 26, 1991

[30] Foreign Application Priority Data

Aug. 27, 1990 [JP] Japan .................. 2-226030

[51] Int. Cl.⁵ .................. H04N 1/00; H04N 1/40
[52] U.S. Cl. .................. 358/261.3; 358/261.2
[58] Field of Search .................. 358/426–; 382/56; 340/802–

[56] References Cited

U.S. PATENT DOCUMENTS 4,097,903  6/1978  Nakagome et al. ............ 358/261.2
4,163,260  7/1979  Hisao et al. ................. 358/261.3
4,212,036  7/1980  Nakagome et al. ............ 358/261.3
4,982,293  1/1991  Ishii ........................ 358/261.3
5,095,512  3/1992  Roberts et al. .............. 358/261.3

Primary Examiner—Stephen Brinich
Attorney, Agent, or Firm—Fitzpatrick, Cella, Harper & Scinto

[57] ABSTRACT

A decoding device for two-dimensional codes employs a first serial reference line signal which assumes the value "1" only at the change point from black to white, and a second reference line signal which assumes the value "1" only at the change point from white to black, either of which is selected according to the color of the start pixel. The end of a reference line can be identified by the value "1" in both reference line signals. The decoding device can thus achieve high-speed development of two-dimensional codes without a large-scale logic circuit.

4 Claims, 9 Drawing Sheets

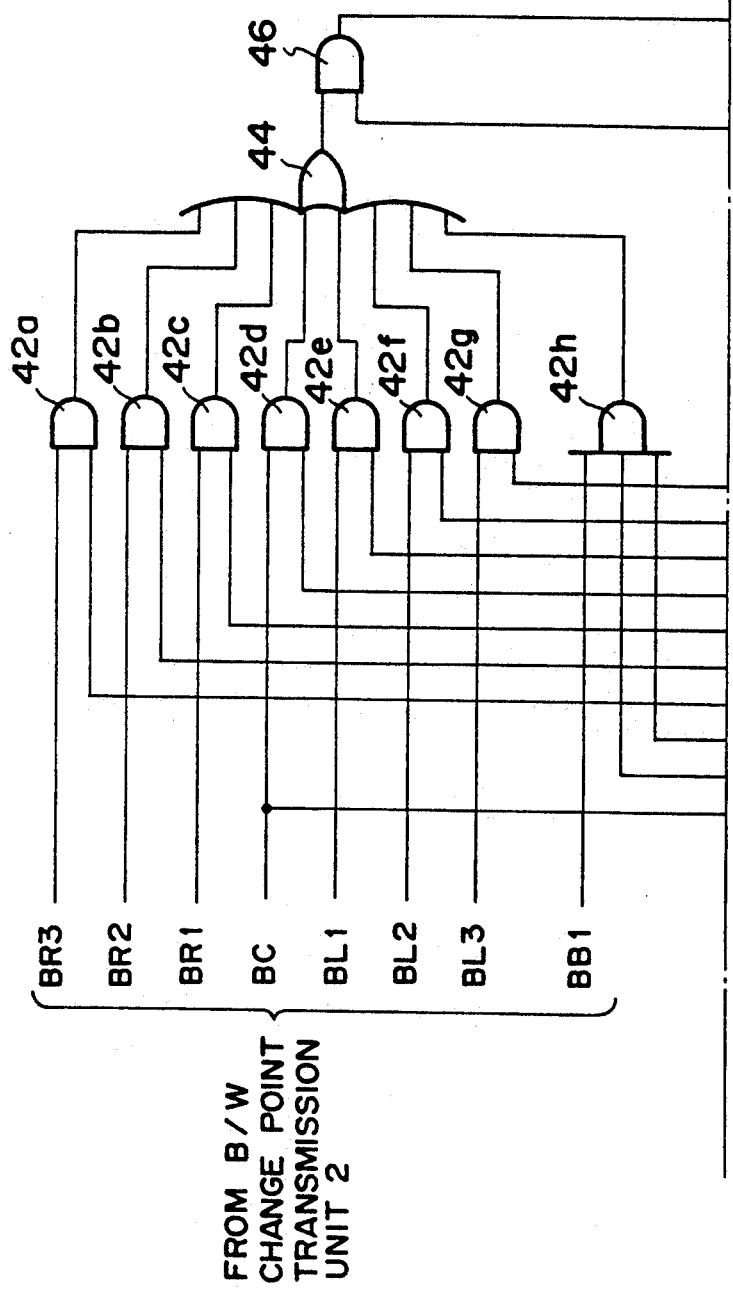

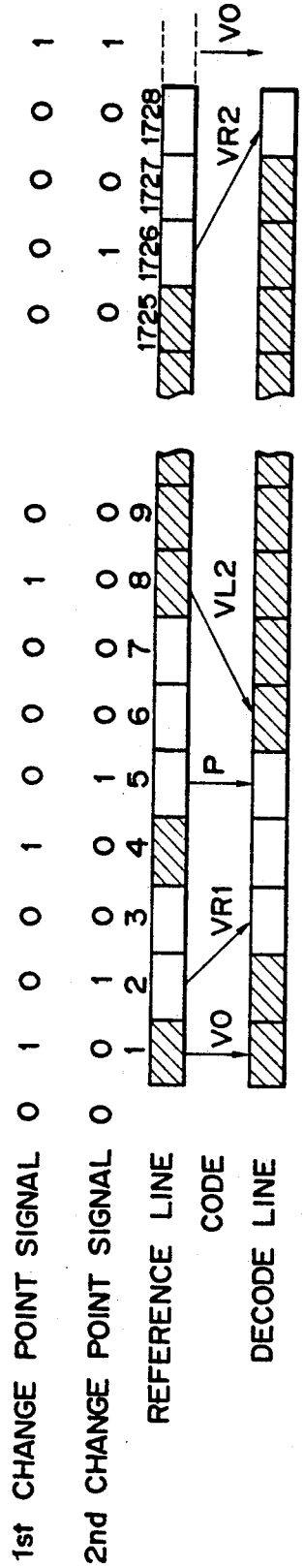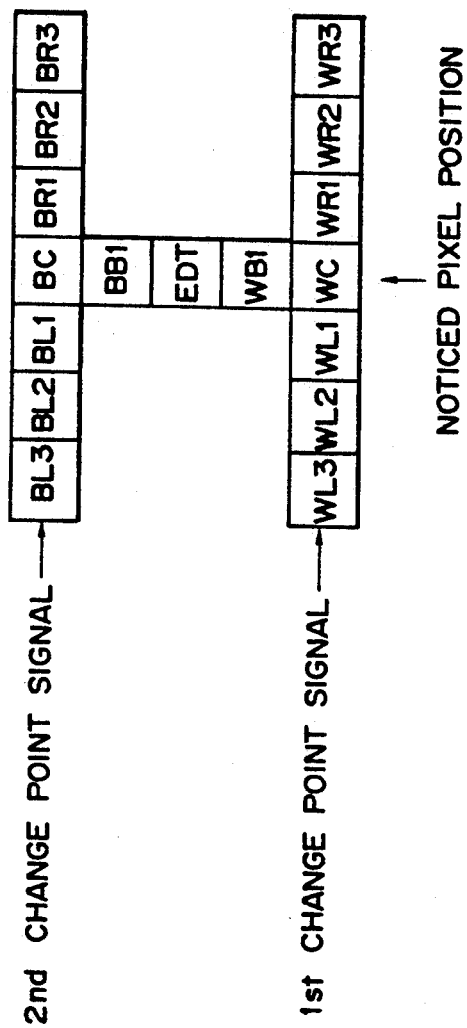
FIG. 4
FIG. 5

DECODING DEVICE FOR TWO-DIMENSIONAL CODES BY USING FIRST OR SECOND REFERENCE LINE SIGNALS

BACKGROUND OF THE INVENTION

1. Field of the Invention

The present invention relates to a decoding device for two-dimensional codes, for reproducing an original image from two-dimensional codes employed as an image data encoding method for use in a facsimile, an image file or the like.

2. Related Background Art

A Conventional developing method for two-dimensional codes consists of counting the run length from a start pixel to an object pixel of variation in a reference line, determining the run length to be restored by arithmetic calculation on the result of the counting and an offset value designated by the two-dimensional codes, and generating the pixel data corresponding to the run length.

However, the above-explained conventional method also requires a calculation to determine the position of the next start pixel, in addition to the above-explained calculations, and requires very complicated and large-sized circuitry if the method is to be executed solely by logic circuits.

For this reason, this conventional developing method has been executed by a processing unit such as a microprocessor.

However, this conventional method, based on program control utilizing such a processing unit, has been associated with a limitation in the processing speed.

SUMMARY OF THE INVENTION

In consideration of the foregoing, one object of the present invention is to provide a decoding device for two-dimensional codes, capable of high-speed development of two-dimensional codes, thereby satisfactorily restoring the original image represented by the two-dimensional code.

Another object of the present invention is to provide a method for separately processing information of variation point from white pixel to black pixel and that from black pixel to white pixel in a reference line, thereby achieving high-speed development of two-dimensional codes based on the variation point.

Still other objects of the present invention, and the features thereof, will become more fully apparent from the following description.

BRIEF DESCRIPTION OF THE DRAWINGS

FIGS. 3A-3B are detailed circuit diagrams of a comparator unit 4 shown in FIG. 1;

FIG. 4 is a view showing an example of pixel data, employed in the explanation of function;

FIG. 5 is a schematic view of output signals from the circuit shown in FIG. 2;

DESCRIPTION OF THE PREFERRED EMBODIMENTS

Figure 1:
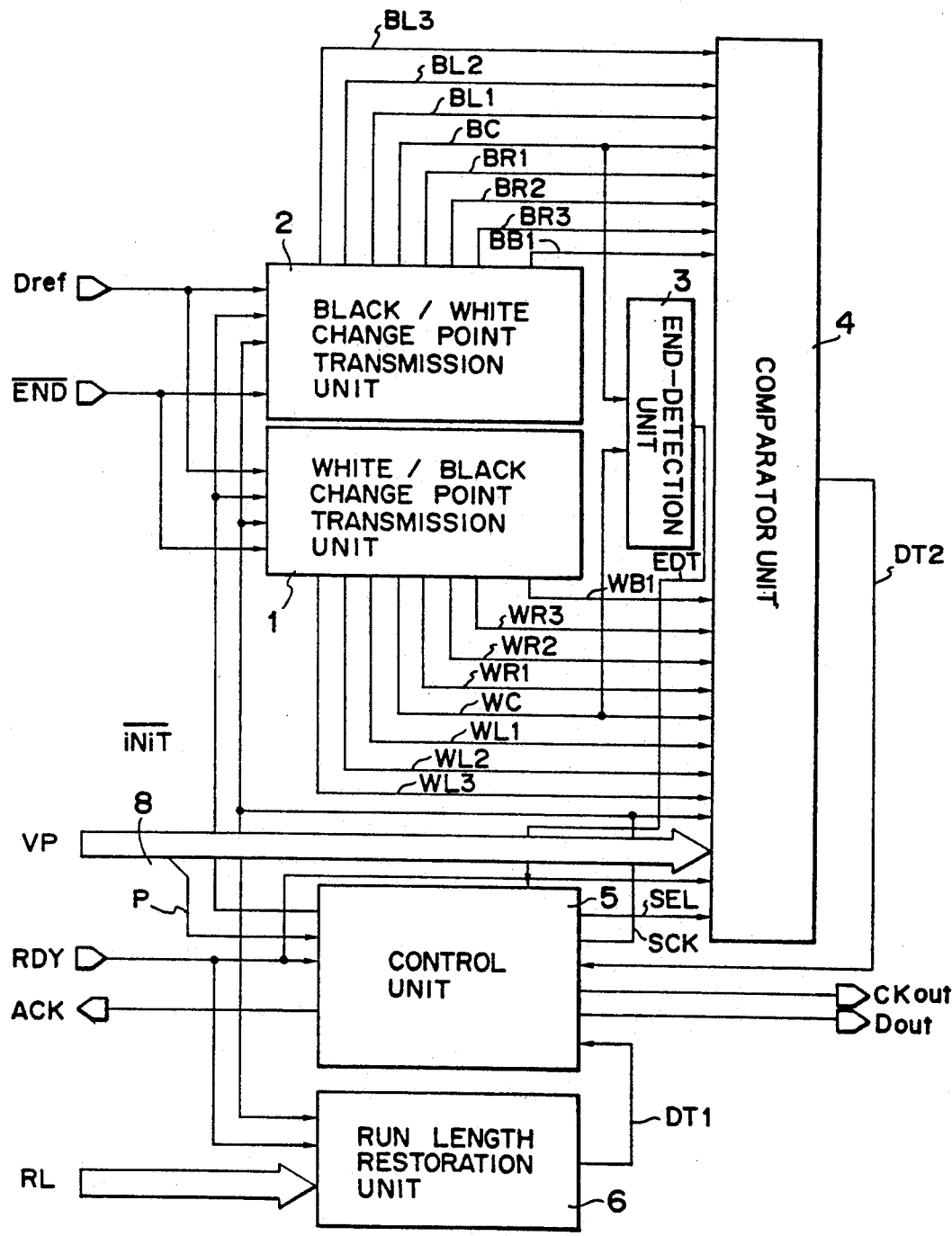
FIG. 1 is a block diagram of an MR code developing unit embodying the present invention.

FIG. 1 is a block diagram of an embodiment of the present invention, including a white/black change point transmission unit 1 for producing a first reference line signal in which a change point from white pixel to black pixel in a reference line is indicated by "1"; a black/white change point transmission unit 2 for producing a second reference line signal in which a change point from black pixel to white pixel in the reference line is indicated by "1"; an end detection unit 3 for recognizing the end of a line by detecting an imaginary change point defined immediately after the last pixel in a reference line; and a comparator unit 4 for selecting either the change point information (WL1 - 3, WC, WR1 - 3, WB1) from said white/black change point transmission unit 1 or the change point information (BL1 - 3, BC, BR1 - 3, BB1) from said black/white change point transmission unit 2 according to the color of the start pixel of a decoded line, and forming logic product of the selected information and a signal VP corresponding to vertical and pass codes in the MR two-dimensional codes.

There are also provided a control unit 5 for generating timing signals for controlling various units, and a run length restoration unit 6 for counting the run length in a case where the result of decoding indicates the horizontal mode.

Figure 2:
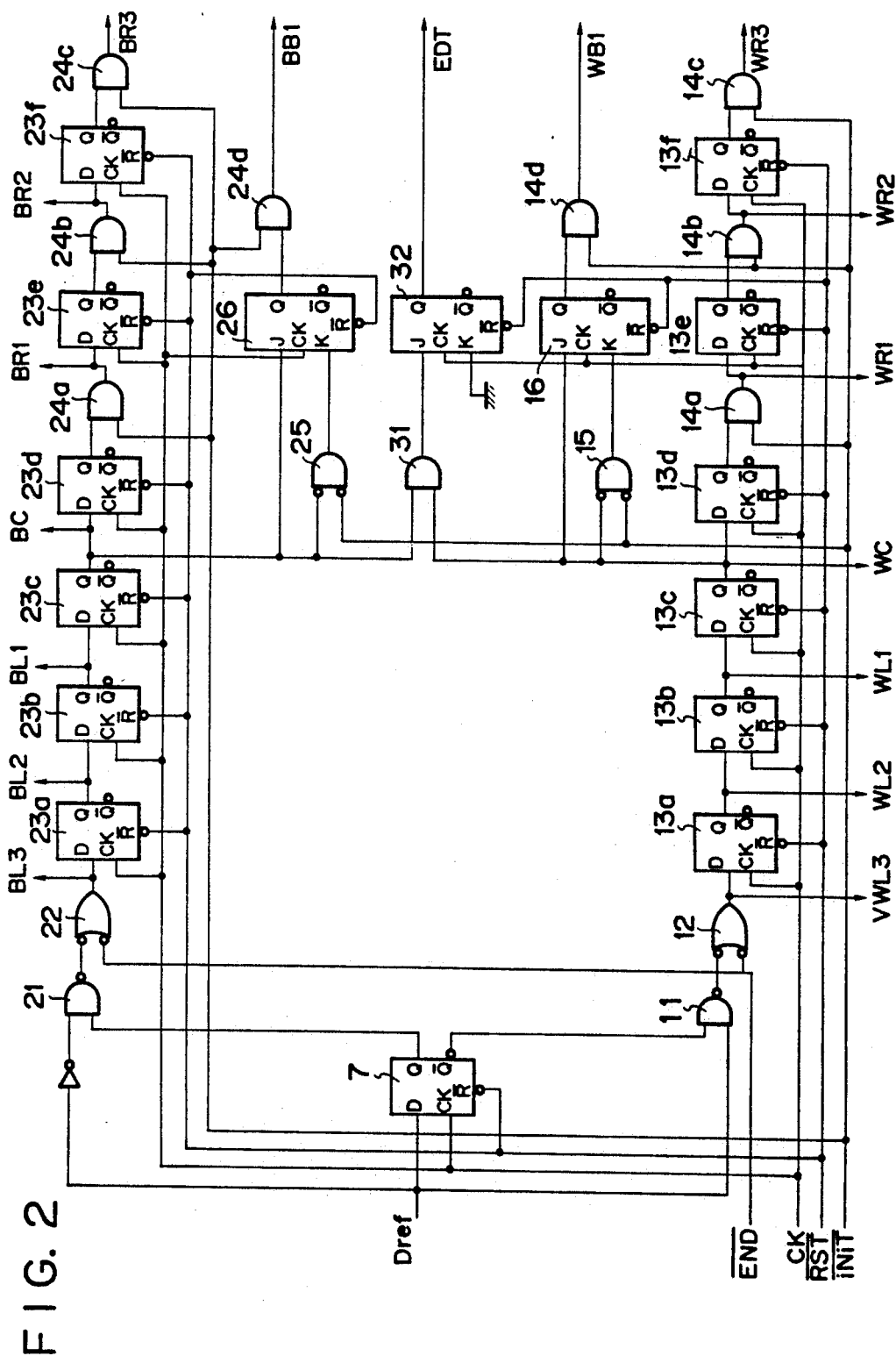
FIG. 2 is a detailed circuit diagram of a white/black change point transmission unit, a black/white change point transmission unit and an end detection unit shown in FIG. 1.

In FIG. 1 there are shown following signals:

Dref: serial reference line input data, in which white and black are respectively represented by 0 and 1;

$\overline{END}$: an end signal assuming "0" when said Dref signal reaches the amount of a line;

VP: eight development instruction signals, corresponding to seven vertical codes and a pass code, obtained by the analysis by an unrepresented analysis unit of the MR codes to be decoded;

RL: run length value, in case the result of analysis, by the analysis unit, of the MR codes to be decoded is given by run length;

RDY a ready signal indicating that said development instruction signals VP and run length value RL are effective;

ACK: a response signal, consisting of a pulse "1" at the end of development by development instruction by said ready signal RDY;

CKout: data clock pulses for producing restored data;

Dout: restored data;

WL3 - WL1, WC, WR1 - WR3, WB1, BL3 - BL1, BC, BR1 - BR3, BB1: change point information on the reference line, generated by the circuit in FIG. 2;

EDT: a line end signal released by said end detection unit 3;

SEL: a selection signal for selecting the change point information according to the color of start pixel of the decoded line;

SCK: data clock pulses for reference line data;

$\overline{INIT}$: a signal for erasing, at the start of development of each code, the change point information in the reference line positioned to the left of a position directly above the start pixel in the decoded line;

DT2: a signal indicating the end of development for a vertical or pass code;

DT1 a signal indicating the end of development of run length in the horizontal mode.

FIG. 2 is a detailed circuit diagram of the white/black change point transmission unit 1, the black/white change point transmission unit 2, and the end detection unit 3 shown in FIG. 1. There is provided, a flip-flop 7 for holding reference pixel data of an immediately preceding clock; a NAND gate 11 for forming change point information from white to black; a NAND gate 12 for forming imaginary change point; flip-flops 13a-13f for transmitting change point information from white to black; AND gates 14a-14d for initializing WR1 - 3, WB 1 and flip-flops 13e, 13f at the start of development of a code; a J-K flip-flop 16 indicating that a first change point b1 on the reference line, generally defined in the MR encoding, has appeared directly above the object pixel; a NOR gate 15 for generating a signal for initializing said J-K flip-flop 16; a NAND gate 21 for producing change point information from black to white; a NAND gate 22 for forming an imaginary change point; flip-flops 23a-23f for transmitting the change point information from black to white; AND gates 24a-24d for initializing signals BR1 - 3, BB1 and flip-flops 23e, 23f at the start of development of a code; a J-K flip-flop 26 for detecting a first change point in the change point information from black to white in the same manner as the J-K flip-flop 16; a NOR gate 25 for producing a signal for initializing the J-K flip-flop 26; an AND gate 31 for producing a logic product of said first and second change point information position directly above the object pixel; and a J-K flip-flop 32 for producing end information of a line.

$\overline{\text{RST}}$ is a reset signal for initializing the present circuit at the start of development of a line.

The following explains output signals in which WL3 - WL1, WC, WR1 - WR3 and WB1 constitute the first change point information mentioned above, and BL3 - BL1, BC, BR1 - BR3 and BB1 constitute the second change point information:

WL3/BL3: change point information positioned at the 3rd pixel to the right of the object pixel on the main scanning line;

WL2/BL2: change point information positioned similarly at the 2nd pixel to the right;

WL1/BL1: change point information positioned similarly at the 1st pixel to the right;

WC/BC: change point information positioned directly above the object pixel;

WR1/BR1: change point information positioned at the 1st pixel to the left of the object pixel;

WR2/BR2: change point information positioned at the 2nd pixel to the left of the object pixel;

WR3/BR3: change point information positioned at the 3rd pixel to the left of the object pixel;

WB1/BB1: a signal indicating the presence of a first change point positioned to the right of the start pixel, at the position WC/BC mentioned above;

EDT: an end detection signal indicating the end of a line, released when said WC and BC become "1" at the same time.

Among the above-mentioned signals, WR1/BR1 - WR3/BR3 and WB1/BB1 are not released for the change points positioned to the left of the start pixel.

Figure 3B:
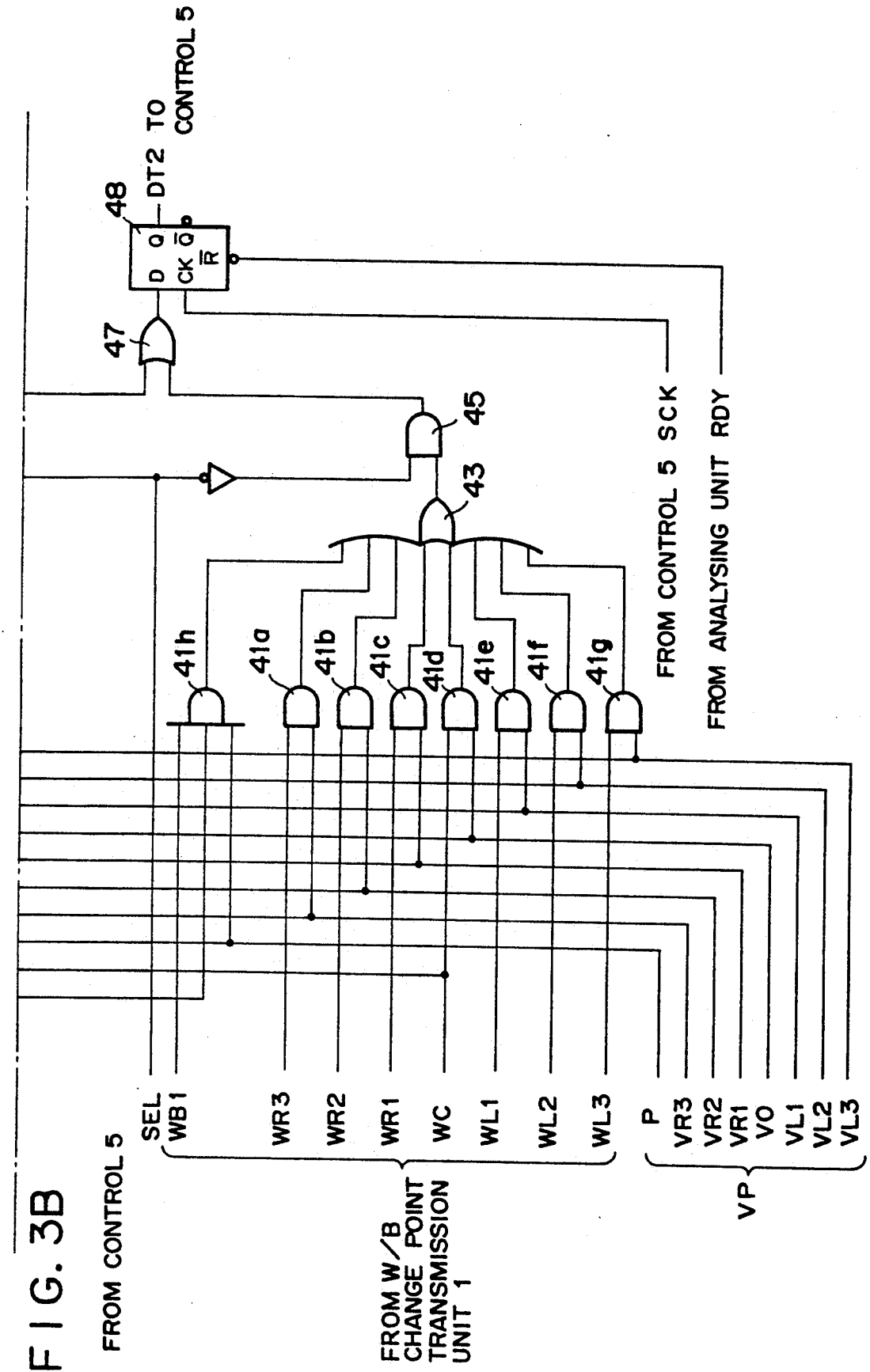

FIG. 3 is a circuit diagram of the comparator unit 4 shown in FIG. 1.

Signals given by the analysis of MR codes and collectively represented as VP in FIG. 1 are written, in FIG. 3, as eight individual signals P, VR3, VR2, VR1, V0, VL1, VL2 and VL3, one of which assumes a value "1" when given by the analysis of the MR code.

The following will explain the function of the circuits shown in FIGS. 1, 2 and 3. First an unrepresented code analysis unit analyzes the MR codes, and, upon fixing a code, releases the RDY signal and the signal VP or RL indicating the result of the analysis.

The control unit 5 recognizes, by said RDY signal, that the analysis result signal is effective, and activates a clock signal SCK for shifting the first and second change point information signal by a pixel, while maintaining the signal $\overline{\text{INIT}}$ at "0". The clock signal SCK is also supplied to the run length restoration unit 6. At the same time, the restored data Dout and the clock signal CKout therefor are also activated.

On the other hand, the comparator unit 4 selects change point information of 7 types, released from the change point transmission unit 1 or 2, according to the color of the start pixel of the decoded line, based on the selection signal SEL released from the control unit 5, forms the logic product of the selected change point information and the signal VP obtained by the analysis of the MR code, and continues to activate the shift clock signal SCK and the clock signal CKout for forming the restored data until the product becomes "1".

The signal $\overline{\text{INIT}}$ assumes a value "1" after two SCK clock pulses.

In a case where the analysis of the MR code indicates the vertical or pass mode, the object pixel position is detected by the comparator unit 4 as explained above and is informed to the control unit 5 by the signal DT2.

On the other hand, if the analysis provides a run length code in the horizontal mode, the number of corresponding clock pulses is counted by the run length restoration unit 6 and is informed by the signal DT1 to the control unit 5.

Upon recognizing the end of development by the signal DT1 or DT2, the control unit 5 releases the response signal ACK to the RDY signal, and deactivates the shift clock signal SCK and the restored data clock signal CKout. The selection signal SEL is inverted, unless the code which has just been developed is pass mode.

In the following, the above-explained operations will be explained in greater detail with a specific example of image data.

FIG. 4 illustrates reference line data and code data taken as an example in the following description.

Also, FIG. 5 illustrates the positional relationship of the signals explained in relation to FIG. 2, including three pixels positioned to the right and left of the object pixel, signals indicating the presence of the first change point on the object pixel (WB1, BB1) and line end detection signal (EDT).

Figure 6:
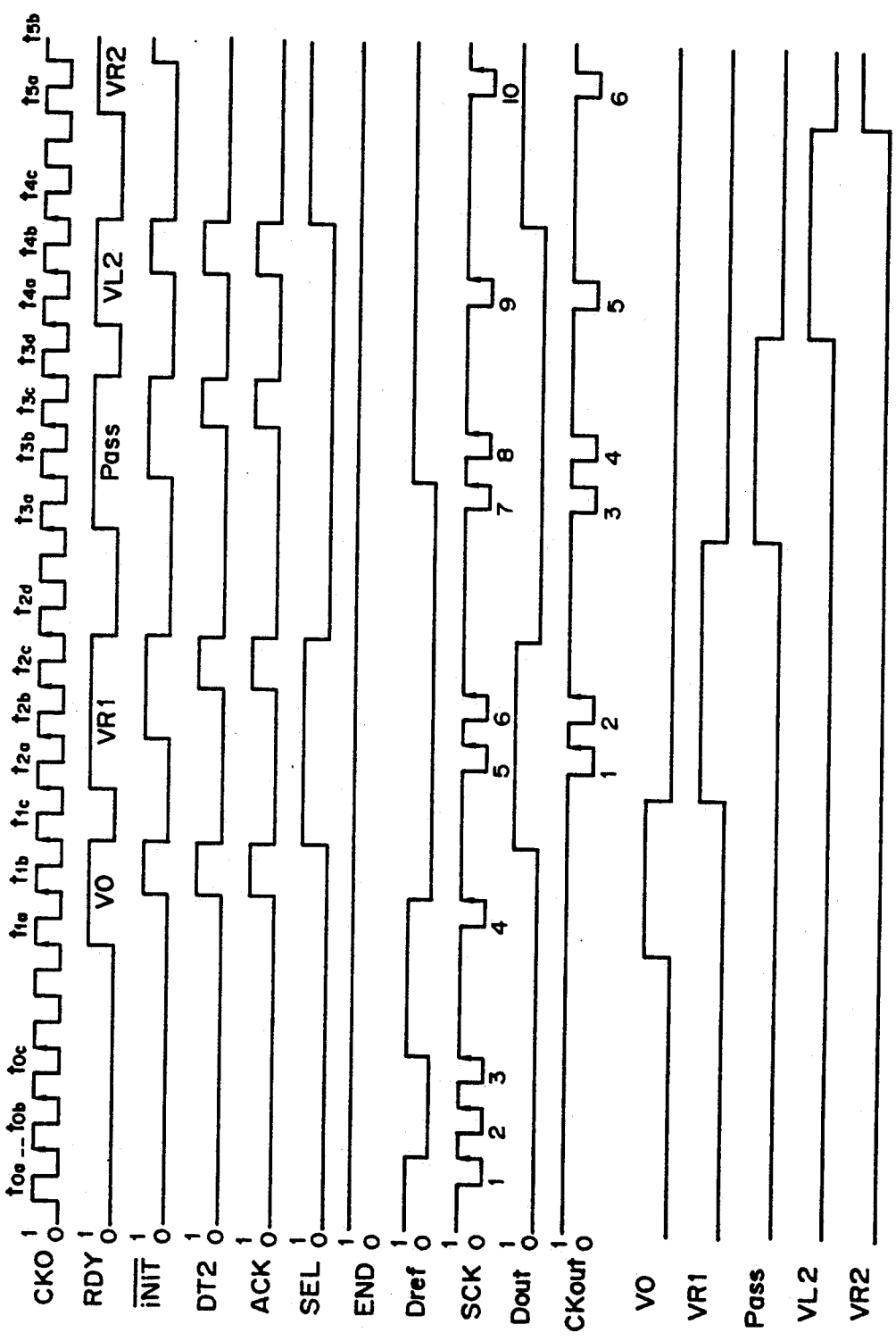
FIGS. 6 and 7 are timing charts of development of the data shown in FIG. 4.
Figure 7:
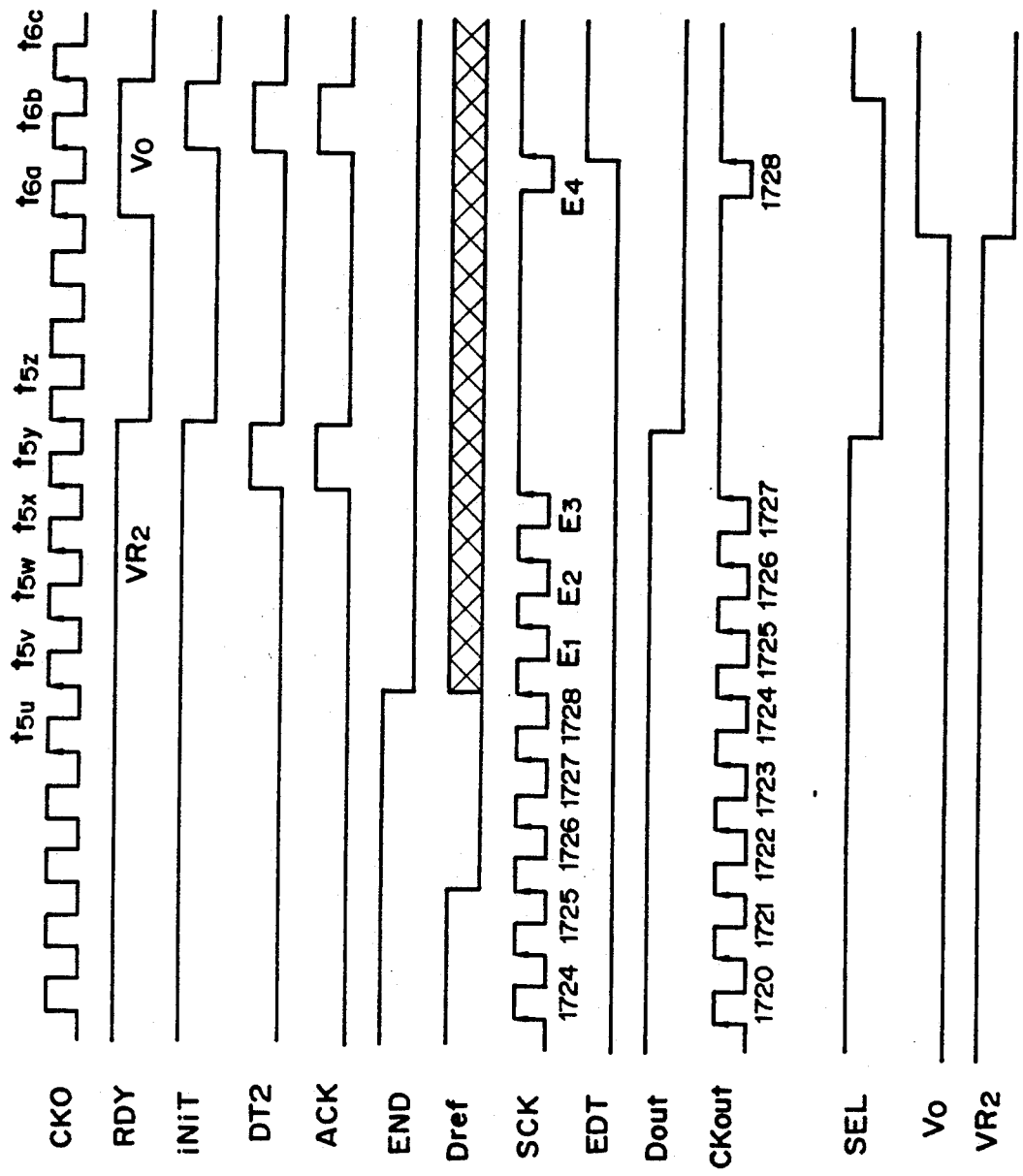
Figure 8:
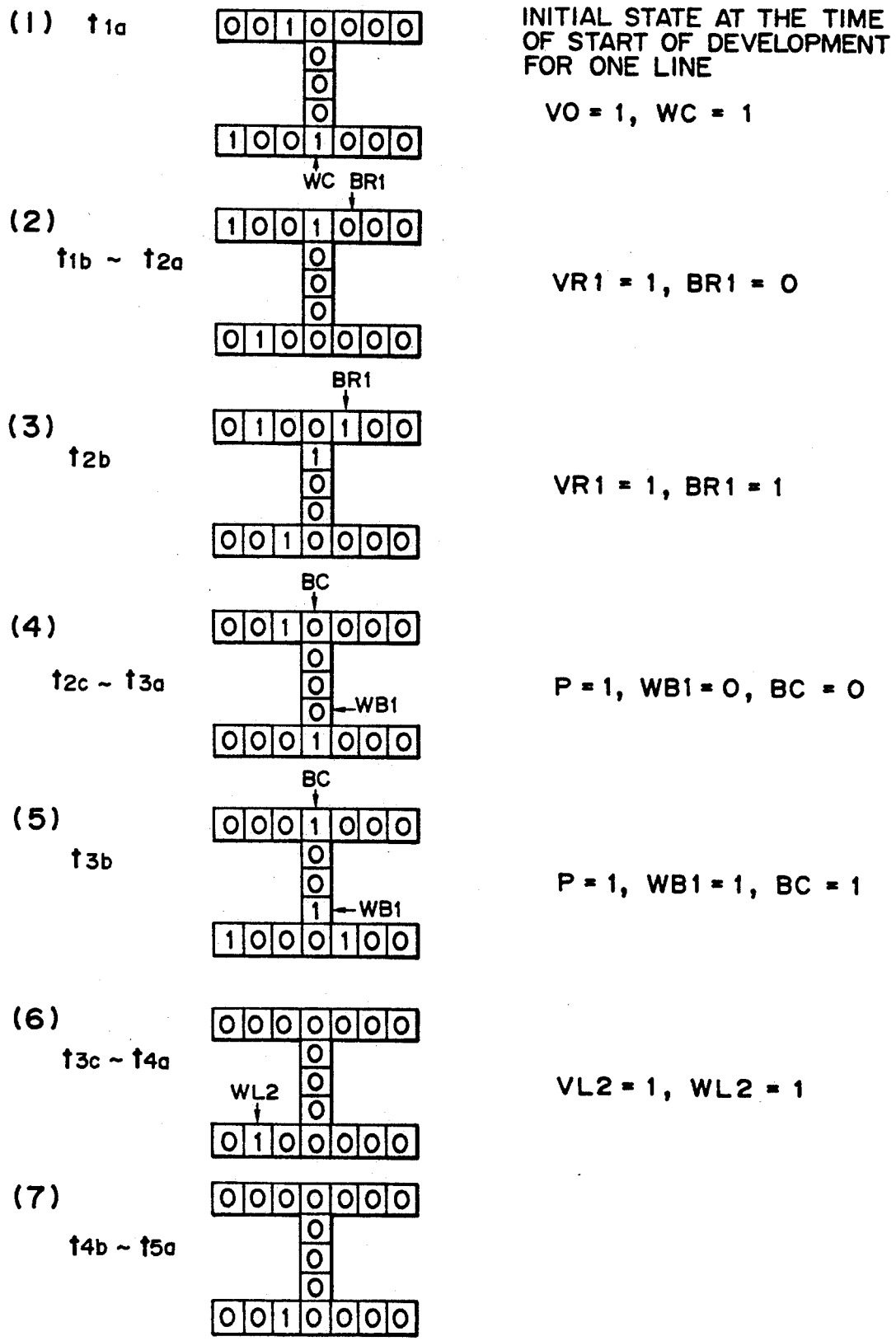
FIGS. 8 and 9 are views showing signal states at different timings in FIGS. 6 and 7, represented according to FIG. 5.
Figure 9:
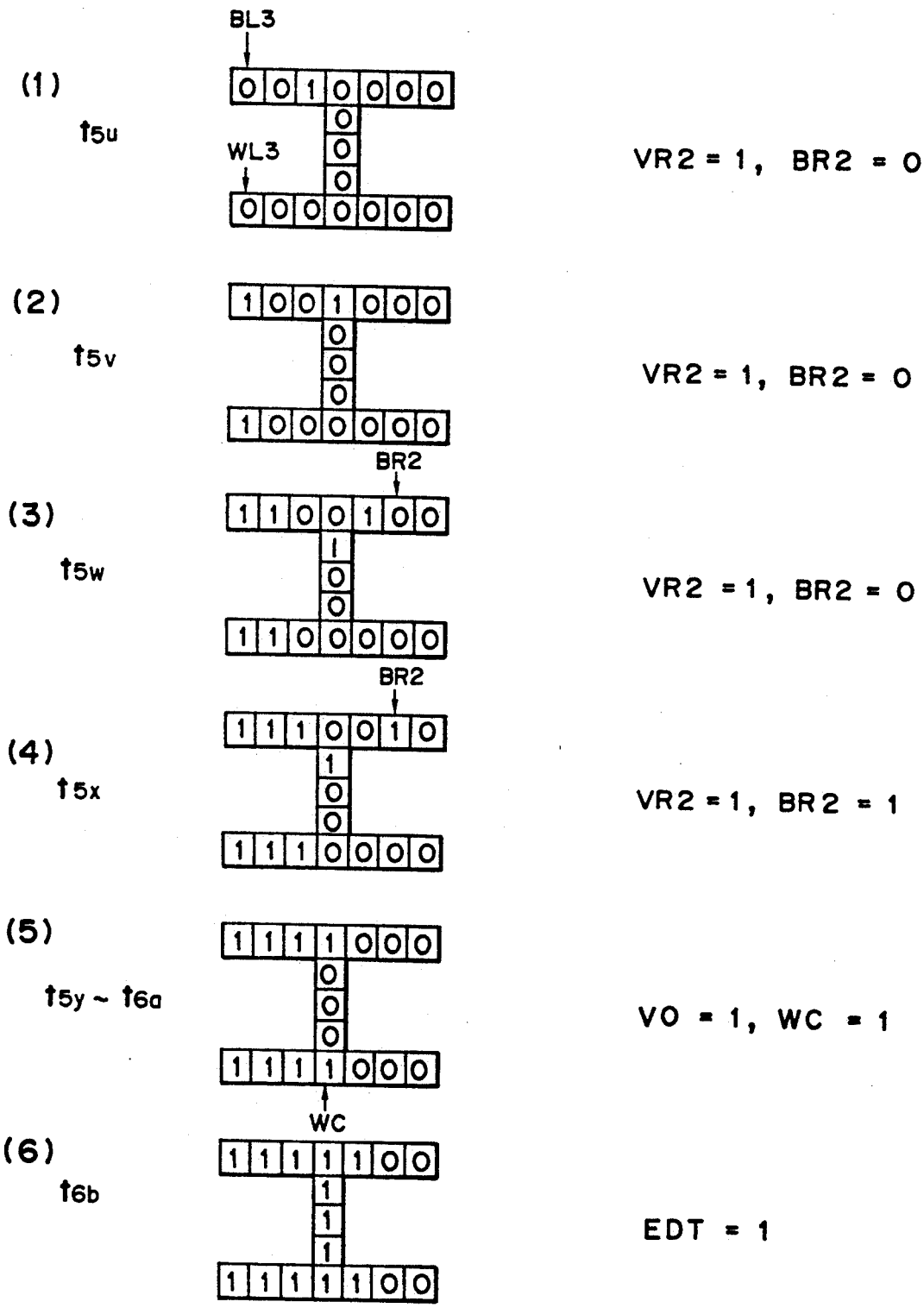

FIGS. 6 and 7 are timing charts of the development of the image shown in FIG. 4, and FIGS. 8 and 9 illustrate the states of the change point information at different timings, according to the mode shown in FIG. 5.

In the following description, it is assumed that the decoded line to be developed is encoded as a sequence V0, VR1, Pass, VL2, . . . , VR2 and V0 as shown in FIG. 4.

$t_{0a}$–$t_{0c}$: At the start of development of a line, the flip-flops shown in FIGS. 2 and 3 are reset, and three shift clock pulses SCK are released to position the change point information of a first pixel on the reference line, at the position WC, BC ((1) in FIG. 8).

$t_{1a}$: When V0=1 and RDY=1 are given as the development instruction signals, the reference data shift clock signal SCK is activated. On the other hand, the restored data clock signal CKout, which is usually activated simultaneously with the clock signal SCK, is suspended by the control unit 5, as an exception, at the initialization in the above-mentioned period $t_{0a}-t_{0c}$ and at this timing $t_{1a}$, since, at $t_{1a}$, the process starts from the imaginary pixel at the start of a line. Also since WC=1, V0=1 and RDY=1 in this state as shown in (1) in FIG. 8, the AND gate 41d, OR gate 43, AND gate 45 and OR gate 47 provide outputs "1".

$t_{1b}$: As the data input to the flip-flop 48 is "1", the signal DT2 is shifted to "1" at this clock pulse. In response the control unit 5 releases ACK =1 as a response signal to RDY=1, thereby informing the end of development for the code V0. It also deactivates the clock signals SCK and CKout.

The signal $\overline{INIT}$ is controlled so as to assume the state "1" with a delay of a clock pulse from the shift RDY=1, and assumes the state "1" at this clock pulse.

$t_{1c}$: In response to the state ACK=1 mentioned above, the RDY signal is shifted to "0", and the signals $\overline{INIT}$, DT2 are also initialized to "0", whereby the signal ACK is shifted to "0".

Also, since the code which has just been developed is the vertical code (namely other than pass code), the signals SEL and Dout are inverted ((2) in FIG. 8).

Thus the development for the initial code V0 is completed.

$t_{2a}$: When the development of a second code VR1 is instructed, the signal BR1 is used this time since SEL=1. Since VR=1 and BR=1, the clock pulses SCK, CKout are activated until the output of the AND gate 42c becomes "1".

$t_{2b}$: As BR1=1 as shown in (3) in FIG. 8, the D-input to the D-flip-flop 48 becomes "1".

$t_{2c}$: The signal DT2=1 is obtained to deactivate the clock signals SCK, CKout, whereby the signal ACK=1 is released.

$t_{2d}$: The signals RDY, $\overline{INIT}$, DT2 and ACK become "0" as in $t_{1c}$, whereby the signals SEL and Dout are inverted.

Thus the development for the second code VR1 is completed.

$t_{3a}$: Instruction for development of the third code, which is a pass code, is given by Pass=1 and RDY=1, whereby the clock signals SCK, CKout are activated.

Since the start pixel is white, the condition for termination of development for the pass code is WB=1 and BC=1, namely an output "1" from the AND gate 41h.

$t_{3b}$: There are obtained WB1=1 and BC=1 as shown in (5) in FIG. 8, satisfying the above-mentioned conditions.

$t_{3c}$: Since DT2=1, there is obtained ACK =1, whereby the clock signals SCK, CKout are deactivated as shown in (6) in FIG. 8.

$t_{3d}$: Because of ACK=1, RDY, $\overline{INIT}$, DT2 and ACK are shifted to "0". However the signals SEL, Dout are not inverted because the code which has just been developed is a pass code.

Succeeding codes VL2, VR2 are similarly developed as indicated in $t_{4a}$, $t_{4c}$ and $t_{5a}-t_{5z}$.

The timing chart shown in FIG. 7 indicates the function at the end of a line:

$t_{5u}$: Change point information on the last pixel of the reference line is entered into WL3, BL3 ((1) in FIG. 9).

$t_{5v}$: As the input of reference line data of a line has been completed, the end signal $\overline{END}=0$ is entered. Thus the NAND gates 12, 22 thereafter release outputs "1" regardless of the value of the reference input data Dref ((2) in FIG. 9).

$t_{5w}$: Since BR2≠1, same operation as in $t_{5v}$ is continued ((3) in FIG. 9).

$t_{5x}$: As BR2=1 is reached, the AND gate 42b, OR gate 44, AND gate 46 and OR gate 47 release outputs "1" ((4) in FIG. 9).

$t_{5y}$: Because of the operation at $t_{5x}$, there is obtained DT2=1, whereby the clock signals SCK, CKout are deactivated and there is obtained ACK=1 ((5) in FIG. 9).

$t_{5z}$: Because of the operation at $t_{5y}$, the signals RDY, $\overline{INIT}$ and ACK are shifted to "0". Also the signals SEL and Dout are inverted because the development which has just been conducted is the vertical mode.

$t_{6a}$: An instruction for development is given by the signals V0 and RDY. Since an imaginary change point signal is already present at WC, the AND gate 41d provides an output signal "1" which is given to the data input of the D-flip-flop 48. Also the clock signal CKout is activated whereby the last pixel of the decoded line is released.

On the other hand, the AND gate releases an output "1" because WC and BC are both "1" by the imaginary change point information ((5) in FIG. 9).

$t_{6b}$: There is obtained ACK=1 because of DT2=1, as in already explained case.

Also at this point the J-K flip-flop provides a Q output "1", whereby the signal EDT is shifted to "1" indicating the completion of restoration of a line ((6) in FIG. 9).

The end position of restoration of a line can be recognized through the above-explained operations.

If a development instruction for a next code is entered in this state, it is identified as an error line. On the other hand, a normal line is identified if an end-of-line code EOL is entered.

The foregoing description has been limited to the MR codes, but it will be apparent that similar effects can be obtained in the development of MMR codes.

Also in the development of MH codes which lack the two-dimensional codes and can employ unfixed data as reference data, the insertion and detection of the imaginary change point according to the present invention can be applied without any change.

As explained in the foregoing, the development of two-dimensional MR codes can be realized without any arithmetic calculation, by employing a first change point signal assuming a value "1" only at the change point from white to black and a second change point signal assuming a value "1" only at the change point from black to white.

Also, the imaginary change point is defined by setting the first and second change point signal at the state "1" at the same time, and the end of a decoded line can be identified by the detection of the state "1" of both change point signals directly above the object pixel. Thus there can be obtained matching between the end timing of the reference line and that of the decoded line with a simple structure.

The present invention has been explained by preferred embodiments thereof, but the present invention is not limited to such embodiments and is subject to various modifications within the scope and spirit of the appended claims.

What is claimed is:

1. A decoding device for decoding two-dimensional codes defining positions of change points, at which the color of pixel changes, of a coding line relative to positions of corresponding change points of a reference line, comprising:

inputting means for inputting reference line data representing the color of each pixel of a reference line;

first generating means for generating first reference line signals assuming a true value at a change point from white pixel to black pixel on the basis of the reference line data;

second generating means for generating second reference line signals assuming a true value at a change point from black pixel to white pixel on the basis of the reference line data;

decoder means for decoding the two-dimensional codes by referring to the first reference line signals or the second reference line signals; and adding means for adding true value to the first and second reference line signals after a line of reference line data is inputted by said inputting means.

2. A decoding device according to claim 1, further comprising selection means for selecting the first reference line signals or the second reference line signals in accordance with a previously decoded two-dimensional code.

3. A decoding device according to claim 1, further comprising detection means for detecting the values of the first and second reference line signals.

4. A decoding device according to claim 3, further comprising determining means for determining the end of a line of the reference line data when said detection means detects that the first and second reference line signals assume true values.

* * * * *

UNITED STATES PATENT AND TRADEMARK OFFICE
CERTIFICATE OF CORRECTION

PATENT NO. : 5,276,526
DATED : January 4, 1994
INVENTOR(S) : YUJI ISHIKAWA

It is certified that error appears in the above-indentified patent and that said Letters Patent is hereby corrected as shown below:

On the Title Page:

AT [56] REFERENCES CITED

U.S. Patent Documents, Insert
    --4,750,043  6/1988  Hisada et al. ..... 358/261--.

COLUMN 1

Line 14, "Conventional" should read --conventional--.

COLUMN 2

Line 45, "RDY" should read --RDY:--.

COLUMN 3

Line 1, "DT1" should read --DT1:--.

COLUMN 6

Line 57, "signal" should read --signals--.

UNITED STATES PATENT AND TRADEMARK OFFICE
CERTIFICATE OF CORRECTION

PATENT NO. : 5,276,526

DATED : January 4, 1994

INVENTOR(S) : YUJI ISHIKAWA

It is certified that error appears in the above-indentified patent and that said Letters Patent is hereby corrected as shown below:

<u>COLUMN 8</u>

Line 4, "true" should read --a true--.

Signed and Sealed this

Thirteenth Day of September, 1994

Attest:

BRUCE LEHMAN

Attesting Officer      Commissioner of Patents and Trademarks